United States Patent
Sobel

(10) Patent No.: US 8,832,254 B1
(45) Date of Patent: Sep. 9, 2014

(54) SYSTEMS AND METHODS FOR MANAGING REGISTRATION AND DISCOVERY OF URI SCHEMES

(71) Applicant: Symantec Corporation, Mountain View, CA (US)

(72) Inventor: William E. Sobel, Jamul, CA (US)

(73) Assignee: Symantec Corporation, Mountain View, CA (US)

(*) Notice: Subject to any disclaimer, the term of this patent is extended or adjusted under 35 U.S.C. 154(b) by 128 days.

(21) Appl. No.: 13/663,269

(22) Filed: Oct. 29, 2012

(51) Int. Cl.
*G06F 15/173* (2006.01)

(52) U.S. Cl.
USPC ............................ 709/223; 709/203; 709/224

(58) Field of Classification Search
USPC ............ 709/223, 224, 203, 217, 219
See application file for complete search history.

(56) References Cited

U.S. PATENT DOCUMENTS

| | | | |
|---|---|---|---|
| 7,200,862 B2* | 4/2007 | Murching et al. | 726/3 |
| 8,667,031 B2* | 3/2014 | Konduri et al. | 707/825 |
| 2009/0157859 A1* | 6/2009 | Morris | 709/223 |
| 2012/0191840 A1* | 7/2012 | Gordon | 709/223 |

* cited by examiner

*Primary Examiner* — Lashonda Jacobs
(74) *Attorney, Agent, or Firm* — Holland & Hart LLP

(57) ABSTRACT

Computer-implemented methods for identifying a set of e URI schemes registered with the device are described. Each URI scheme having a URI scheme name beginning with a URI namespace name and ending with a character in a first character location of a URI namespace is enumerated. Iteratively, a next character location of the URI namespace is added to the URI scheme name of each enumerated URI scheme, and each URI scheme having a URI scheme name ending with a character in the next character location of the URI namespace is enumerated. The set of URI schemes registered with the device is identified as the URI schemes at ends of URI scheme name branches in the URI namespace.

20 Claims, 11 Drawing Sheets

SYSTEMS AND METHODS FOR MANAGING REGISTRATION AND DISCOVERY OF URI SCHEMES

BACKGROUND

The use of computing devices and computer-related technologies continues to increase at a rapid pace. This increased use of computer devices has influenced the advances made to computer-related technologies. Indeed, computing devices have increasingly become an integral part of the business world and the activities of individual consumers. Computing devices may be used to carry out several business, industry, and academic endeavors. The wide-spread use of these devices has been accelerated by the increased use of communication networks, and computer networks, including the Internet.

Many businesses and individuals use one or more communication and/or computer networks to communicate and share data between the various devices connected to the networks. The productivity and efficiency of employees often require human and computer interaction. Users of computer technologies continue to demand an increase in the efficiency of these technologies. Improving the efficiency of these technologies is desirable to anyone who uses and relies on computer devices.

Computing devices may be mobile so that users may carry these systems as they travel, shop, work, etc. These devices may also be used to communicate with other devices. For example, computing devices may be mobile telephones. Mobile computing systems enter a "locked" state after a predetermined of time, after receiving a specific command from a user input, when powered up, and the like. This locked state may prevent unauthorized users from accessing data that may be stored on the system. In addition, the locked state may prevent unauthorized users from accessing various features and functions of the system. In order to unlock a system, a user may be required to enter a password or other credential via a user input on the device.

Mobile computing systems may also, in some cases, contain applications and data that are privy to a particular environment, such as a work environment. Mobile computing systems may also contain applications and data that are privy to different and even disparate environments.

SUMMARY

According to at least one embodiment, a computer-implemented method for identifying a set of unique URI schemes registered with a device is described. Each URI scheme having a URI scheme name beginning with a URI namespace name and ending with a character in a first character location of a URI namespace is enumerated. Iteratively, a next character location of the URI namespace is added to the URI scheme name of each enumerated URI scheme, and each URI scheme having a URI scheme name ending with a character in the next character location of the URI namespace is enumerated. The set of URI schemes registered with the device is identified as the URI schemes at ends of URI scheme name branches in the URI namespace.

In some embodiments of the identification method, a URI scheme name of each URI scheme in the set of URI schemes is used to access information pertaining to a respective ecosystem of applications corresponding to each URI scheme name.

In some configurations of the method, the information on respective ecosystems of applications is accessed by accessing information stored in a shared storage location such as an iPhone Operating System (iOS) pasteboard.

In some examples, the information on each ecosystem of applications includes an identifier of each ecosystem of applications, and the discovery method further involves displaying the identifier of each ecosystem of applications to a user of the device. The identifier of each ecosystem may include an ecosystem name or icon. In some embodiments, a user selection of an ecosystem may be received, and a process to join the user-selected ecosystem may be initiated.

In some configurations of the method, the discovered set of unique URI schemes includes at least two URI schemes registered by different ecosystems of applications.

In some embodiments of the method, the URI schemes may be URL schemes.

In some configurations of the method, the URI namespace may have 16 or 32 character locations.

A computing device configured to identify a set of URI schemes is also described. The device including a processor and a memory in electronic communication with the processor. Instructions may be stored in the memory. The instructions may be executable by a processor to enumerate each URI scheme having a URI scheme name beginning with a URI namespace name and ending with a character in a first character location of a URI namespace. The instructions may be further executable by the processor to iteratively, add a next character location of the URI namespace to the URI scheme name of each enumerated URI scheme, and enumerate each URI scheme having a URI scheme name ending with a character in the next character location of the URI namespace. Further, the instructions may be executable by the processor to identify the set of URI schemes registered with the device, the URI schemes at ends of URI scheme name branches in the URI namespace.

A computer-program product for identifying a set of URI schemes on a device is also described. The computer-program product may include a non-transitory computer-readable medium having instructions thereon. The instructions may be executable by a processor to enumerate each URI scheme having a URI scheme name beginning with a URI namespace name and ending with a character in a first character location of a URI namespace. The instructions may also be executable by the processor to iteratively, add a next character location of the URI namespace to the URI scheme name of each enumerated URI scheme, and enumerate each URI scheme having a URI scheme name ending with a character in the next character location of the URI namespace. Further, the instructions may be executable by the processor to identify the set of URI schemes registered with the device, the URI schemes at ends of URI scheme name branches in the URI namespace.

According to at least one embodiment, a computer-implemented method for registering a URI scheme with a device is described. An identifier of a URI scheme is generated. A series of URI scheme names are generated by appending a first N characters of the identifier to a URI namespace name. N is an integer ranging from one to a number of character locations in the unique identifier. URI schemes corresponding to each of the URI scheme names are registered with the device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
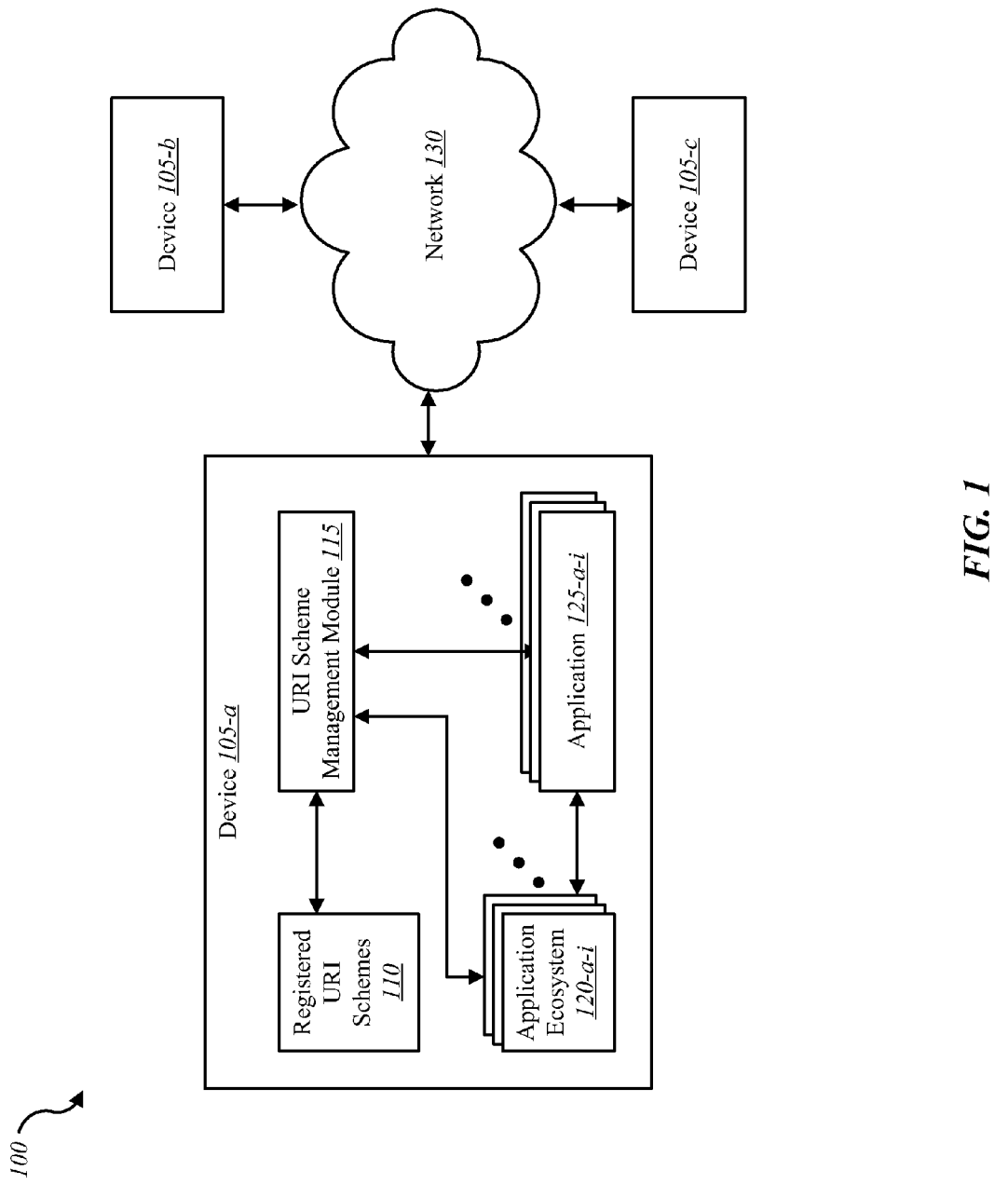
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As described in U.S. patent application Ser. No. 13/598, 248 entitled "Secure App Ecosystem with Key and Data Exchange According to Enterprise Information Control Policy", which application is hereby incorporated by reference, a group of applications (or "apps") on a computing device may be configured as an "ecosystem" of applications. The applications of an ecosystem can securely exchange encrypted messages and encrypted data objects according to an information control policy, while apps and other components outside the ecosystem are not authorized to access the ecosystem or its contents.

In some cases, an ecosystem may be established by an ecosystem agent. The ecosystem agent may also handle admissions of applications to the ecosystem. Still further, the ecosystem agent may handle creation of an encrypted ecosystem directory. The directory contains a record (entry) for each active ecosystem application, including the ecosystem agent, which is itself an application. The location in which the directory is stored may be platform-specific. For example, under iOS, the directory can be stored as a pasteboard object. An application may locate the directory (e.g., in the iOS pasteboard) if it knows the directory's name. An application authorized to access an ecosystem may already know the name of its encrypted ecosystem directory. However, an application that has not yet been admitted to the ecosystem may not know the name of the directory.

In some cases, it may be useful to provide applications with a way to find the names of encrypted ecosystem directories hosted by a device. In this manner, for example, a newly installed application may discover the names of the directories, determine the existence of one or more ecosystems that it may be able to join, and prompt a user to select one or more ecosystems that the application should attempt to join. Upon the user selecting an ecosystem for the application to join, a process for joining the ecosystem (e.g., a "join protocol") may be initiated. As part of the join protocol, the application or user will be asked to provide credentials establishing the application's right to join the ecosystem.

As also described in U.S. patent application Ser. No. 13/598,248, more than one ecosystem may be co-resident on a single computing device and configured such that the co-resident ecosystems are not allowed to access each other's data or otherwise participate in protected ecosystem-level data sharing of other ecosystems.

In some cases, the names of ecosystems can be stored or accessed by virtue of the ecosystems registering respective URI schemes with a device. The URI schemes may provide, or provide access to, the names of the ecosystems and thereby provide a way to discover information about the ecosystems. However, to date, there is no known method for an application having no prior knowledge of the URI schemes to discover the URI schemes in a time-efficient manner.

Turning now to the figures, FIG. 1 is a block diagram illustrating one embodiment of an environment 100 in which the present systems and methods may be implemented. In one example, a number of devices 105-a, 105-b, 105-c may communicate with each other across a network 130. The devices 105-a, 105-b, 105-c may be mobile or stationary devices. The devices 105-a, 105-b, 105-c may take the same or different forms, and may be cell phones, smartphones, personal digital assistants (PDAs), servers, laptop computers, tablets, or any other type of mobile or stationary computing device. The network 130 may be a wireless wide area network (WAN), a local area network (LAN), a cellular network, or any other type of communication network.

The device 105-a is shown to have a number of registered URI schemes 110. Information pertaining to the registered URI schemes 110 may be stored in a system memory or other storage device of the device 105-a. A URI scheme management module 115 provides a mechanism to register or discover a URI scheme in the registered URI schemes 110.

Various applications and processes may invoke the URI scheme management module 115. For example, in some embodiments, the device 105-a may host one or more ecosystems of applications 120-a-i, where i is an integer greater than or equal to one. An agent or other process of each ecosystem 120-a-i may invoke the URI scheme management module 115 to register a plurality of URI schemes with the device 105-a (and typically, with an operating system of the device 105-a) and log the URI schemes in the registered URI schemes 110. The device 105-a may also host one or more applications 125-a-i that may prompt the device user to join one of the ecosystems 125-a-i. Each of these applications 125-a-i may invoke the URI scheme management module 115 to discover all or a subset of the registered URI schemes 110, to thereby discover information pertaining to the ecosystems 120-a-i and attempt to join one or more of the ecosystems 120-a-i.

Figure 2:
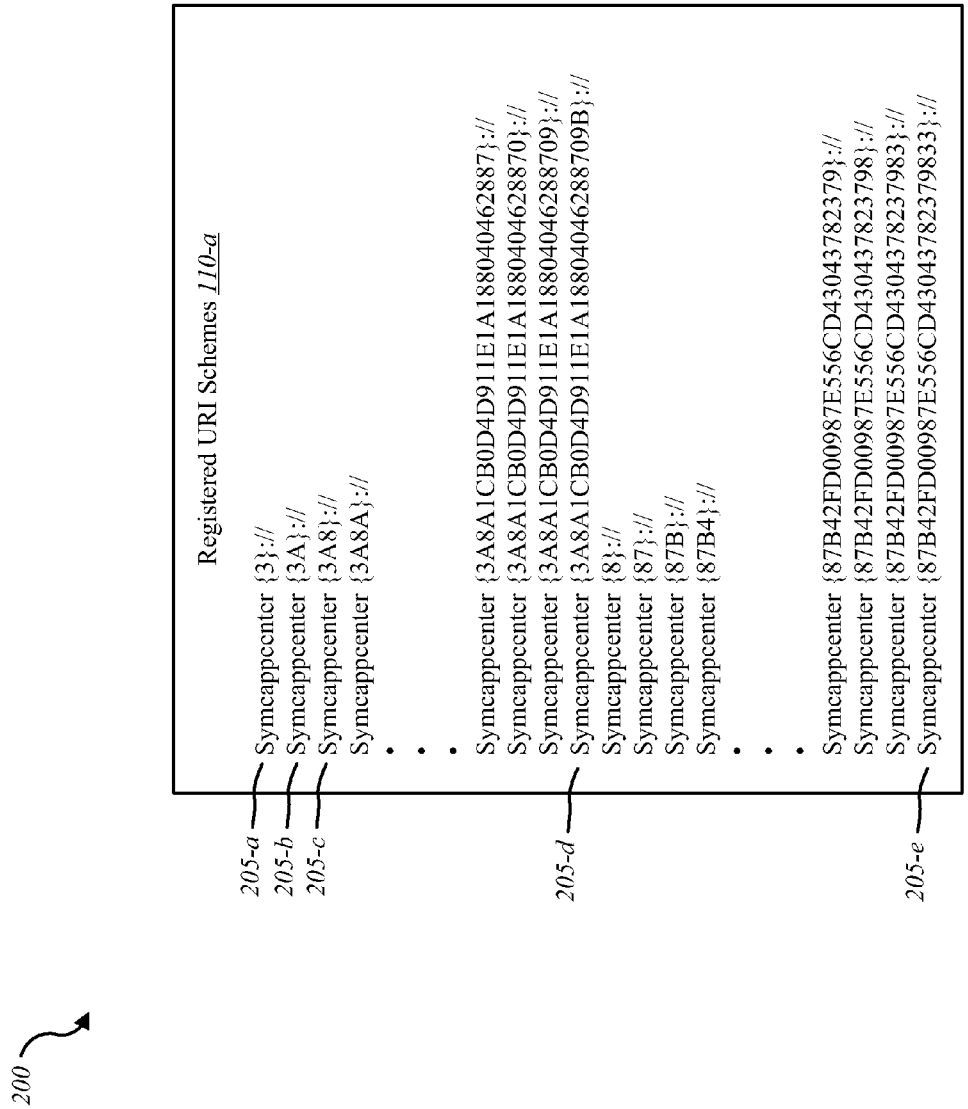
FIG. 2 is a listing of one embodiment of registered URI schemes.

FIG. 2 is a listing 200 of one embodiment of registered URI schemes 110-a. In one configuration, the registered URI schemes 110-a may be an example of the registered URI schemes 110 illustrated in FIG. 1. As shown, each registered URI scheme 205-a, 205-b, 205-c, 205-d, 205-e has a URI scheme name beginning with a URI namespace name (e.g., Symcappcenter) and ending with a first N characters of a unique identifier (e.g., {3} for URI scheme 205-a; {3A} for URI scheme 205-b; {3A8} for URI scheme 205-c; {3A8A1CB0D4D911E1A18804046288709B} for URI scheme 205-d; and {87B42FD00987E556CD43043782379833} for URI scheme 205-e). Each of the unique identifiers (e.g., {3A8A1CB0D4D911E1A18804046288709B} and {87B42FD00987E556CD43043782379833}) identifies a unique URI scheme. For the unique identifier {3A8A1CB0D4D911E1A18804046288709B}, URI scheme 205-a has a URI scheme name ending with the first character of the unique identifier (i.e., N=1), URI scheme 205-b has a URI scheme name ending with the first two characters of the unique identifier (i.e., N=2), and URI scheme 205-d has a URI scheme name ending with the unique identifier (i.e., N=number of character locations in the unique identifier).

Figure 3:
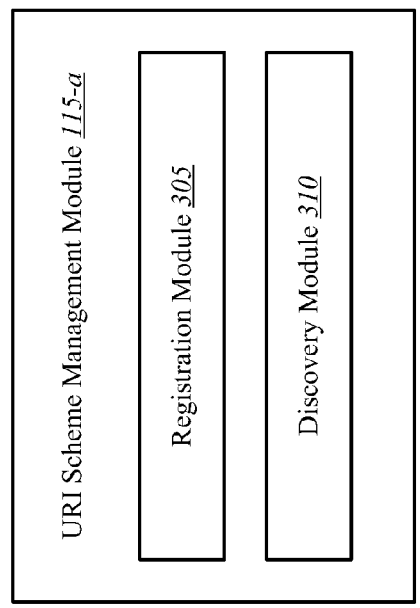
FIG. 3 is a block diagram illustrating one embodiment of a URI scheme management module.

FIG. 3 is a block diagram 300 illustrating one embodiment of a URI scheme management module 115-a. In one configuration, the URI scheme management module 115-a may be an example of the URI scheme management module 115 illustrated in FIG. 1. In one embodiment, the URI scheme management module 115-a may include a registration module 305 and a discovery module 310. The registration module 305 may be invoked to register one or more URI schemes with the device 105-a and log the one or more URI schemes in the registered URI schemes 110 (FIG. 1) or 110-a (FIG. 2). The discovery module 310 may be invoked to discover a set of (i.e., one or more) unique URI schemes registered with the device.

In some embodiments, the URI scheme management module 115 (FIG. 1) or 115-a (FIG. 2) may be provided as a stand-alone application or utility. In other embodiments, part or all of the URI scheme management module 115 or 115-a may be provided as part of a device operating system. In other embodiments, part or all of the URI scheme management module 115 or 115-a may be provided as part of an ecosystem agent for an ecosystem of applications 120-a-i, or as part of an application 125-a-i. In particular, it may be useful to provide the registration module 305 as part of an ecosystem agent and provide the discovery module 310 as part of an application 125-a-i.

Figure 4:
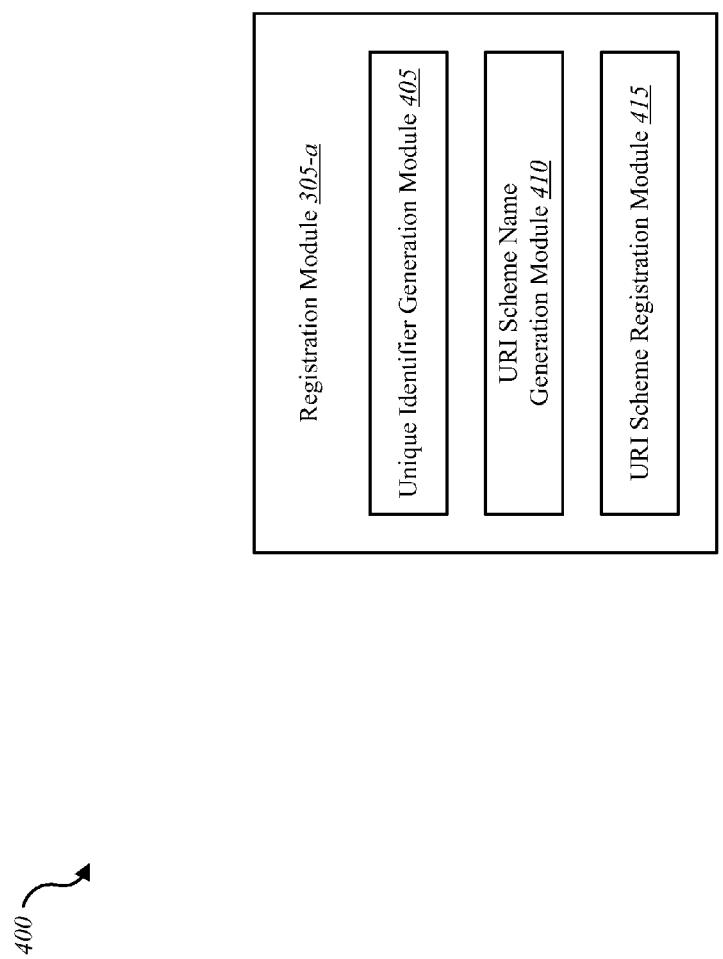
FIG. 4 is a block diagram illustrating one embodiment of a registration module.

FIG. 4 is a block diagram 400 illustrating one embodiment of a registration module 305-a. In one configuration, the registration module 305-a may be an example of the registration module 305 illustrated in FIG. 3. In one embodiment, the registration module 305-a may include a unique identifier generation module 405, a URI scheme name generation module 410, and a URI scheme registration module 415.

Upon the registration module 305-a being invoked to register a unique URI scheme with a device (e.g., the device 105-a in FIG. 1), the unique identifier generation module 405 generates a unique identifier of the unique URI scheme. In some embodiments, the unique identifier is a 128-bit or 32 character identifier including one or more of the hexadecimal characters 0-9 and A-F. In other embodiments, the unique identifier is a 64-bit or 16 character identifier including one or more of the hexadecimal characters 0-9 and A-F. In further embodiments, the unique identifier could have other numbers of bits or other numbers or types of characters. The length of the unique identifier (or depth of the namespace) should be configured to mitigate the likelihood of two applications or entities mapping to the same identifier, thereby making the identifier not unique. In some cases, a hashing or pseudo-random approach can be used to generate the unique identifier, thereby further mitigating the likelihood of two applications or entities mapping to the same identifier.

The URI scheme name generation module 410 generates a series of URI scheme names by appending a first N characters of the unique identifier to a URI namespace name, where N is an integer ranging from one to a number of character locations in the unique identifier. FIG. 2 provides an example listing of the URI scheme names generated by the URI scheme name generation module 410. For example, for the unique identifier {3A8A1CB0D4D911E1A18804046288709B}, having 32 characters, the URI scheme name generation module 410 generates the URI scheme name "Symcappcenter {3}" for N=1, the URI scheme name "Symcappcenter {3A}" for N=2, and so on, including the URI scheme name "Symcappcenter {3A8A1CB0D4D911E1A18804046288709B}" for N=32.

The URI scheme registration module 415 registers, with the device 105-a, a URI scheme 205-a, 205-b, 205-c, 205-d (FIG. 2) corresponding to each of the URI scheme names generated by the URI scheme name generation module 410.

By registering a series of URI schemes with a device, the registration module 405 creates a discoverable branch of URI scheme names within a URI namespace (e.g., a discoverable branch of URI scheme names within the "Symcappcenter" namespace). This provides a substantial reduction in the time required to search for and discover a URI scheme within the URI namespace.

In some cases, more than one URI scheme may be registered within the same namespace. This can be particularly useful when it is desirable to discover existing URI schemes of a particular type, such as URI schemes identifying each of the ecosystems 120-a-i hosted on the device 105-a (FIG. 1). The registration of URI schemes having a URI scheme name formed by appending a unique identifier to a namespace name is also useful when multiple applications want to register URI schemes having the same name. In the past, and by way of example, when two applications registered the same URL scheme (a form of URI scheme) with iOS, there were difficulties to enumerate the applications that had registered the URL scheme, and it was undefined as to which application was to be invoked when a URL using the URL scheme was opened. There were difficulties to resolve conflicts between applications using a shared URL scheme, and there were challenges to enumerate the applications that shared a URL scheme. As described in greater detail below, the URI registration scheme provided by the registration module 405 enables two applications to use a variant of the same URI scheme, wherein the name of the URI scheme becomes a namespace name for unique URI schemes.

Figure 5:
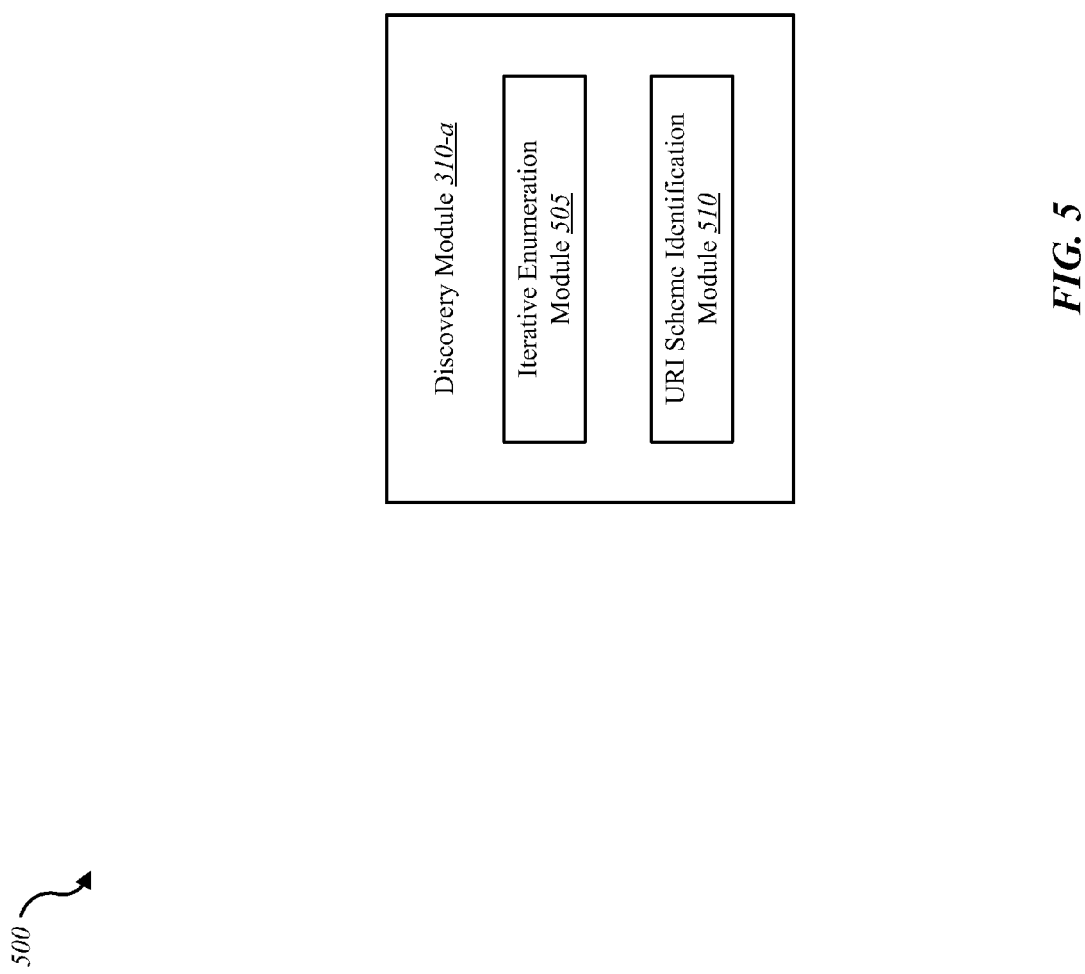
FIG. 5 is a block diagram illustrating one embodiment of a discovery module.

FIG. 5 is a block diagram 500 illustrating one embodiment of a discovery module 310-a. In one configuration, the discovery module 310-a may be an example of the discovery module 310 illustrated in FIG. 3. In one embodiment, the discovery module 310-a may include an iterative enumeration module 505 and a URI scheme identification module 510.

Upon the discovery module 310-a being invoked to discover a set of unique URI schemes registered with a device (e.g., the device 105-a in FIG. 1), the iterative enumeration module 505 may enumerate each URI scheme having a URI scheme name beginning with a URI namespace name and ending with a character in a first character location of a URI namespace. For the listing 200 of registered URI schemes 110-a shown in FIG. 2, this provides an enumeration of URI schemes having the form of "symcappcenter {_}, which yields the URI schemes "symcappcenter {3}" and "symcappcenter {8}". The iterative enumeration module 505 then proceeds to iteratively 1) add a next character location of the URI namespace to the URI scheme name of each enumerated URI scheme, and 2) enumerate each URI scheme having a URI scheme name ending with a character in the next character location of the URI namespace. Thus, for the listing 200 of registered URI schemes 110-a, the iterative enumeration module 505 would next enumerate the URI schemes having the forms of "symcappcenter {3_}" and "symcappcenter {8_}", which yields the URI schemes "symcappcenter {3A}" and "symcappcenter {87}". Iterative enumerations then continue until the two URI scheme name branches within the "symcappcenter" are fully resolved, yielding the URI schemes "Symcappcenter {3A8A1CB0D4D911E1A18804046288709B}" and "Symcappcenter {87B42FD00987E556CD43043782379833}".

The URI scheme identification module 510 identifies, as a discovered set of unique URI schemes registered with a device, the URI schemes at the ends of URI scheme name branches in a namespace. Thus, for the listing 200 of registered URI schemes 110-a, the URI scheme identification module 510 would identify the following set of unique URI schemes: "Symcappcenter {3A8A1CB0D4D911E1A18804046288709B}" and "Symcappcenter {87B42FD00987E556CD43043782379833}".

Figure 6:
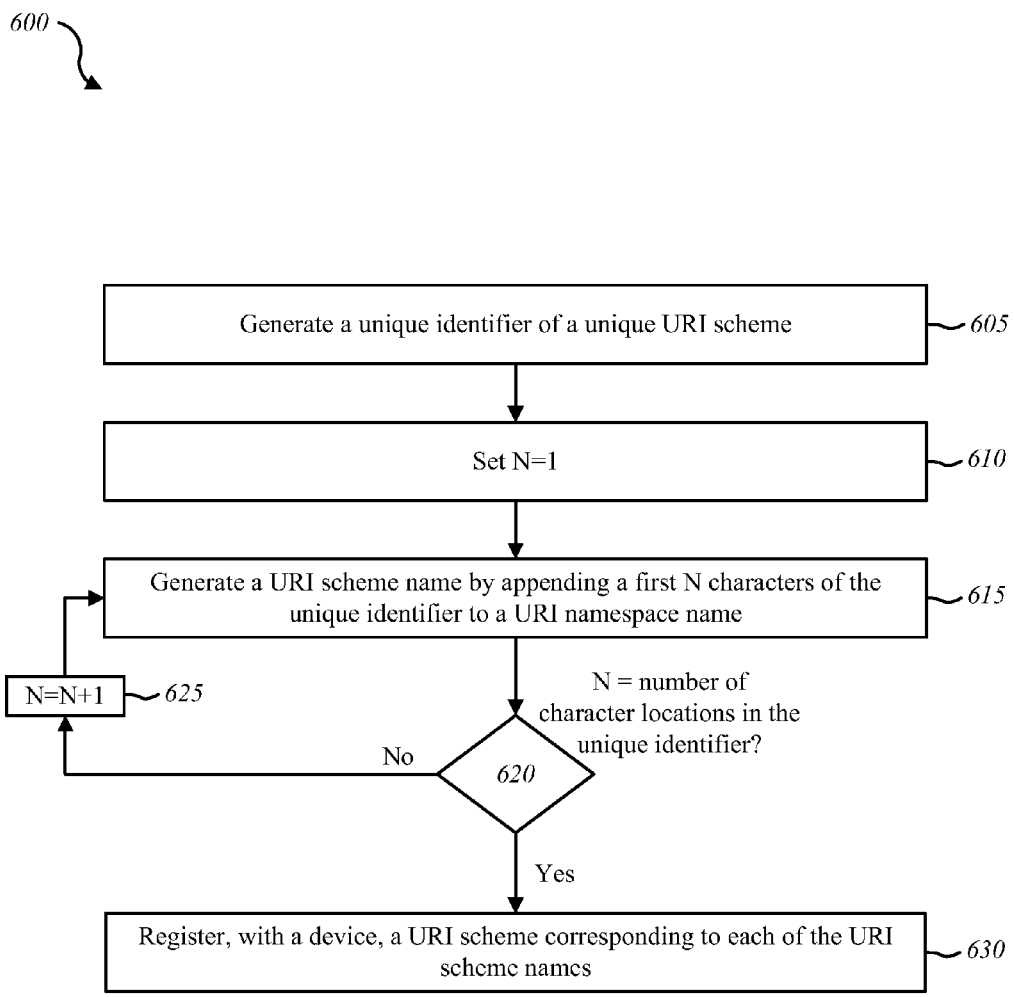
FIG. 6 is a flow diagram illustrating one embodiment of a method for registering a unique URI scheme with a device.

FIG. 6 is a flow diagram illustrating one embodiment of a method 600 for registering a unique URI scheme with a device. In one configuration, the method 600 may be implemented by the device 105-a in FIG. 1. In particular, the method 600 may be implemented by a registration module 305 (FIG. 3) of the URI scheme management module 115 or 115-a.

At block 605, a unique identifier of a unique URI scheme is generated. In some embodiments, the unique identifier may be 128-bits and include 32 characters. In other embodiments, the unique identifier may be 64-bits and include 16 characters.

In blocks 610, 615, 620 and 625, a series of URI scheme names are generated. In block 610, a variable, N, is set to 1. At block 615, a URI scheme name is generated by appending a first N characters (initially one character) of the unique identifier to a URI namespace name. At block 620, a check is made to determine whether N is equal to the number of character locations in the unique identifier. If not, N is incremented (i.e., N=N+1) at block 625 and another iteration is made through the operations at blocks 615 and 620 of the method 600. If, however, N is determined to equal the number of character locations in the unique identifier at block 620, the method 600 proceeds to block 630.

At block 630, a URI scheme corresponding to each of the URI scheme names generated at block 615 is registered with the device to which the URI schemes apply. The method 600 may be repeated for each of a number of unique URI schemes to be registered with the device.

Figure 7:
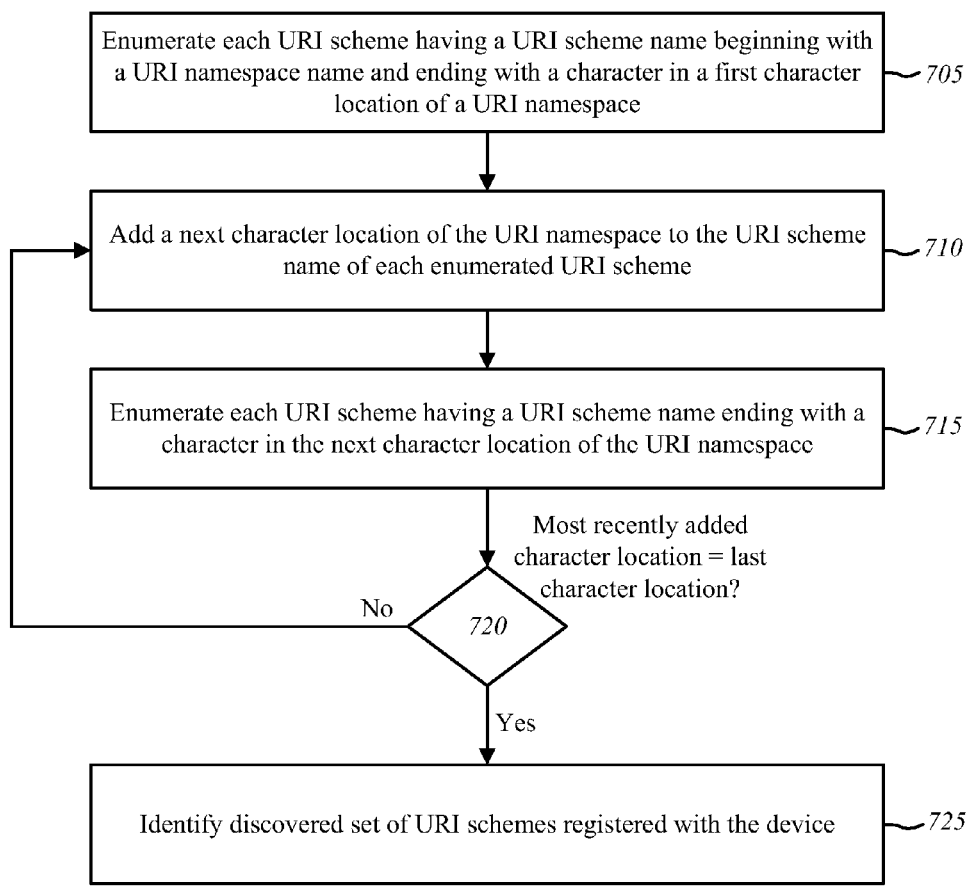
FIG. 7 is a flow diagram illustrating one embodiment of a method for discovering a set of unique URI schemes registered with a device.

FIG. 7 is a flow diagram illustrating one embodiment of a method 700 for discovering a set of unique URI schemes registered with a device. In one configuration, the method 700 may be implemented by the device 105-a in FIG. 1. In particular, the method 700 may be implemented by a discovery module 310 (FIG. 3) of the URI scheme management module 115 or 115-a.

At blocks 705, 710, 715 and 720, a series of URI schemes are iteratively enumerated. First, at block 705, each URI scheme having a URI scheme name beginning with a URI namespace name and ending with a character in a first character location of a URI namespace is enumerated. Then, at block 710, a next character location of the URI namespace is added to the URI scheme name of each enumerated URI scheme. At block 715, each URI scheme having a URI scheme name ending with a character in the next character location of the URI namespace is enumerated. At block 720, a check is made to determine whether the most recently added character location is the last character location of the URI namespace. If not, another iteration is made through the operations at blocks 710, 715 and 720. Otherwise, the method 700 proceeds to block 725.

At block 725, a discovered set of unique URI schemes is identified. The set of unique URI schemes are the URI schemes at the ends of URI scheme name branches in the URI namespace.

Figure 8:
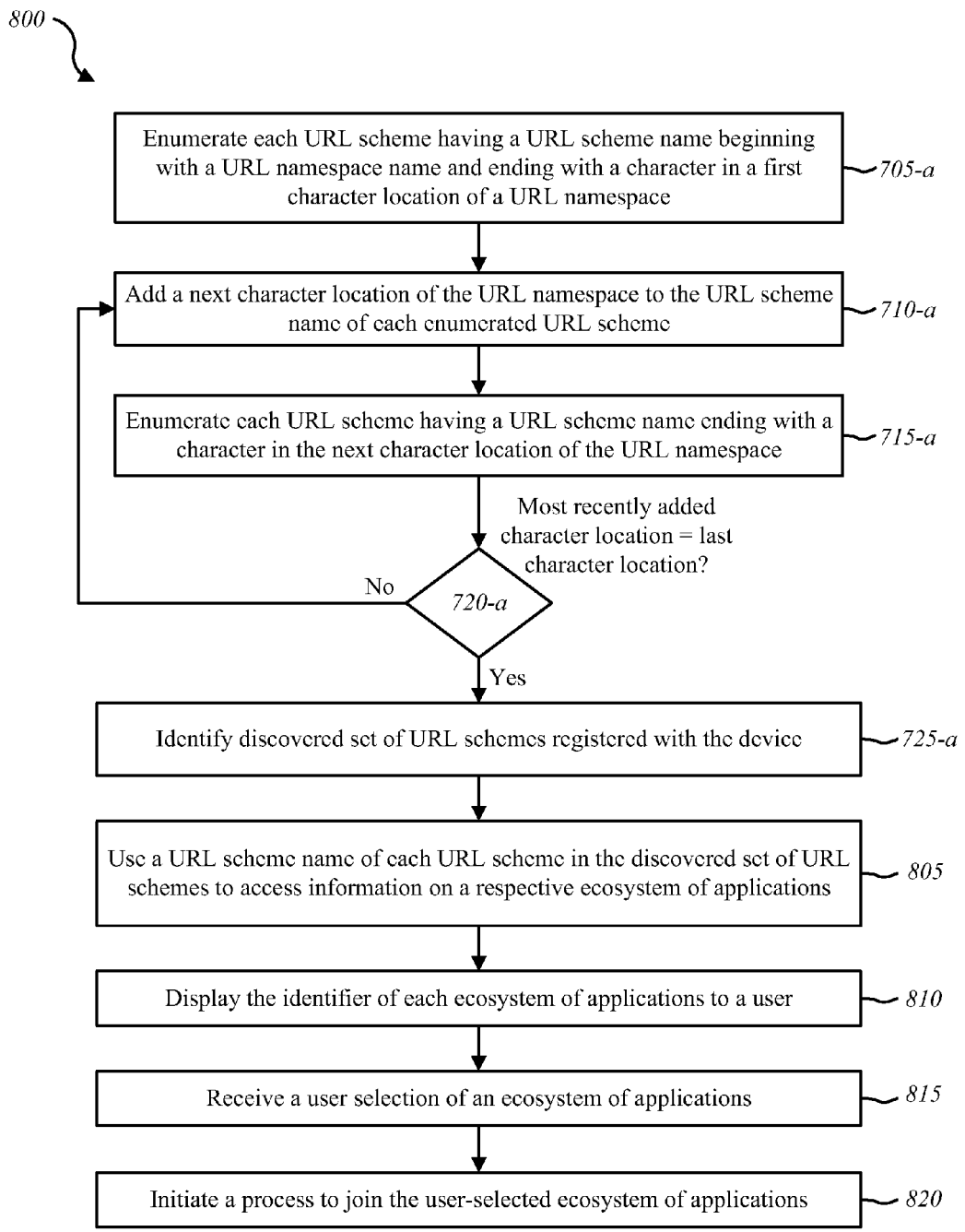
FIG. 8 is a flow diagram illustrating another embodiment of a method for discovering a set of unique URI schemes registered with a device.

FIG. 8 is a flow diagram illustrating another embodiment of a method 800 for discovering a set of unique URI schemes registered with a device. In one configuration, the method 800 may be implemented by the device 105-a in FIG. 1. In particular, the method 800 may be implemented by a discovery module 310 (FIG. 3) of the URI scheme management module 115 or 115-a. By way of example, the method 800 is described in terms of discovering a set of unique URL schemes. In other embodiments, the method 800 may be more generally applied to the discovery of URI schemes.

At blocks 705-a, 710-a, 715-a and 720-a, a series of URL schemes are iteratively enumerated. First, at block 705-a, each URL scheme having a URL scheme name beginning with a URL namespace name and ending with a character in a first character location of a URL namespace is enumerated. Then, at block 710-a, a next character location of the URL namespace is added to the URL scheme name of each enumerated URL scheme. At block 715-a, each URL scheme having a URL scheme name ending with a character in the next character location of the URL namespace is enumerated. At block 720-a, a check is made to determine whether the most recently added character location is the last character location of the URL namespace. If not, another iteration is made through the operations at blocks 710-a, 715-a and 720-a. Otherwise, the method 800 proceeds to block 725-a.

At block 725-a, a discovered set of unique URL schemes is identified. The set of unique URL schemes are the URL schemes at the ends of URL scheme name branches in the URL namespace.

At block 805, a URL scheme name of each URL scheme in the discovered set of unique URL schemes is used to access information pertaining to a respective ecosystem of applications corresponding to each URI scheme name. The information may include an identifier of each ecosystem of applications. In some embodiments, each identifier may be or include a name of the ecosystem or an icon for the ecosystem.

At block 810, the identifier of each ecosystem is displayed to a user of the device on which the ecosystems are hosted, and at block 815, a user selection of one or more of the ecosystems is received. At block 820, a process may be initiated to join the user-selected ecosystem of applications. In some embodiments, the operations performed at blocks 805, 810, 815 and 820 may be performed by an application that is being launched for the first time on a device, or by an application that a user has caused to discover available ecosystems that it may join (e.g., an application 125-a-i of FIG. 1).

Figure 9:
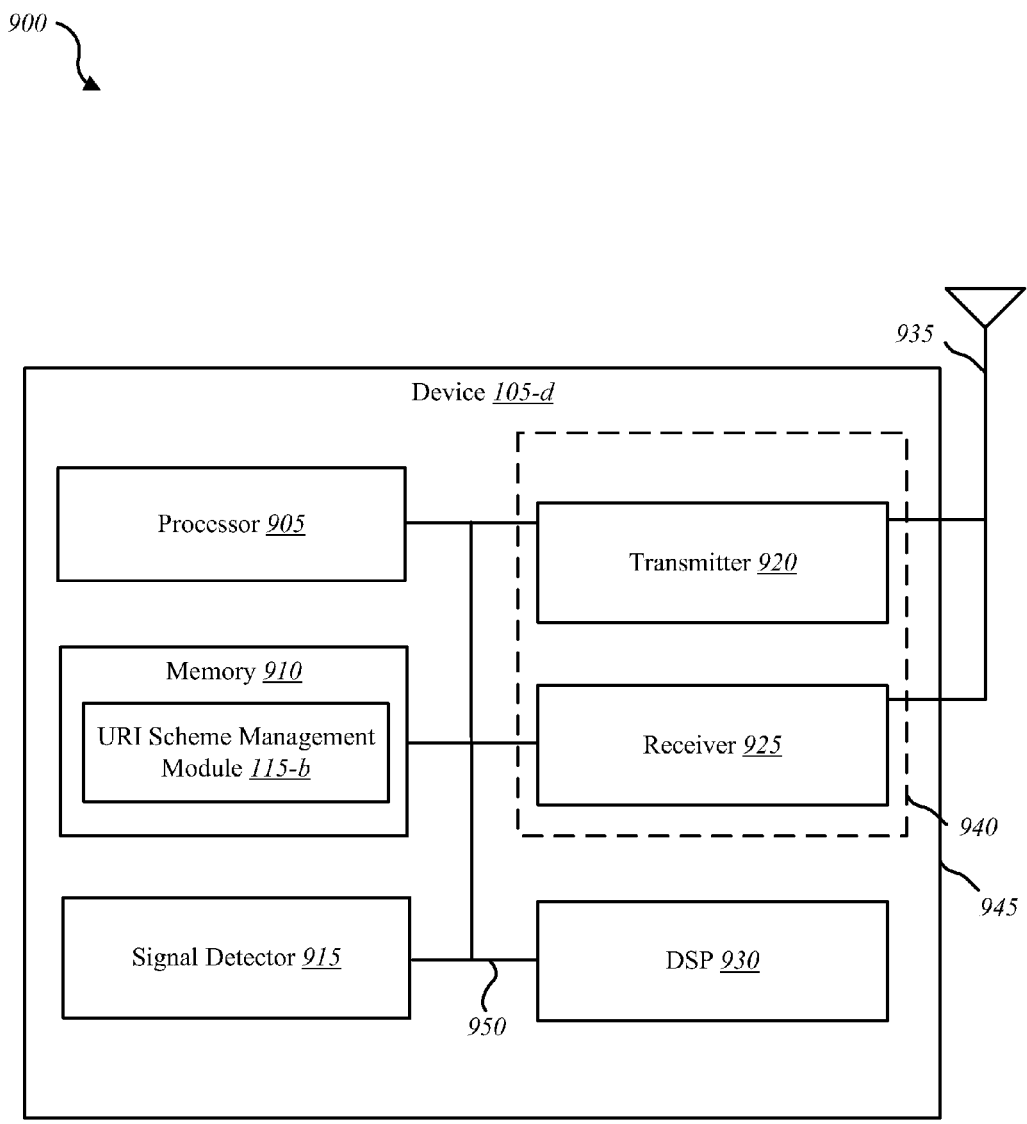
FIG. 9 is a block diagram illustrating a device that may implement the present systems and methods.

FIG. 9 is a block diagram 900 illustrating a computing device 105-d. The device 105-d may include various components that may be used to implement the present systems and methods. The device 105-d may be an example of the device 105-a, 105-b or 105-c of FIG. 1. The device 105-d may be a wireless communications device, such as, but not limited to, a cellular telephone, a smart phone, or a PDA.

The device 105-*d* may include a processor 905 which controls operation of the device 105-*d*. The processor 905 may also be referred to as a central processing unit (CPU). Memory 910, which may include both read-only memory (ROM) and random access memory (RAM), provides instructions and data to the processor 905. A portion of the memory 910 may also include non-volatile random access memory (NVRAM). The processor 905 typically performs logical and arithmetic operations based on program instructions stored within the memory 910. The instructions in the memory 910 may be executable to implement the methods described herein. For example, the URI scheme management module 115-*b* may be stored in the memory 910. The module 115-*b* may be an example of the URI scheme management module 115 of FIG. 1.

The device 105-*d* may also include a housing 945 that may include a transmitter 920 and a receiver 925 to allow transmission and reception of data between the device 105-*d* and a remote location. The transmitter 920 and receiver 925 may be combined into a transceiver 940. An antenna 935 may be attached to (and routed internally and/or externally to) the housing 945 and electrically coupled to the transceiver 940. The device 105-*d* may also include (not shown) multiple transmitters, multiple receivers, multiple transceivers and/or multiple antennas.

The device 105-*d* may also include a signal detector 915 that may be used to detect and quantify the level of signals received by the transceiver 940. The signal detector 915 may detect such signals as total energy, pilot energy per pseudonoise (PN) chips, power spectral density, and other signals. The device 105-*d* may also include a digital signal processor (DSP) 930 for use in processing signals.

The various components of the device 105-*d* may be coupled together by a bus system 950 which may include a power bus, a control signal bus, and a status signal bus in addition to a data bus. However, for the sake of clarity, the various busses are illustrated in FIG. 9 as the bus system 950.

Figure 10:
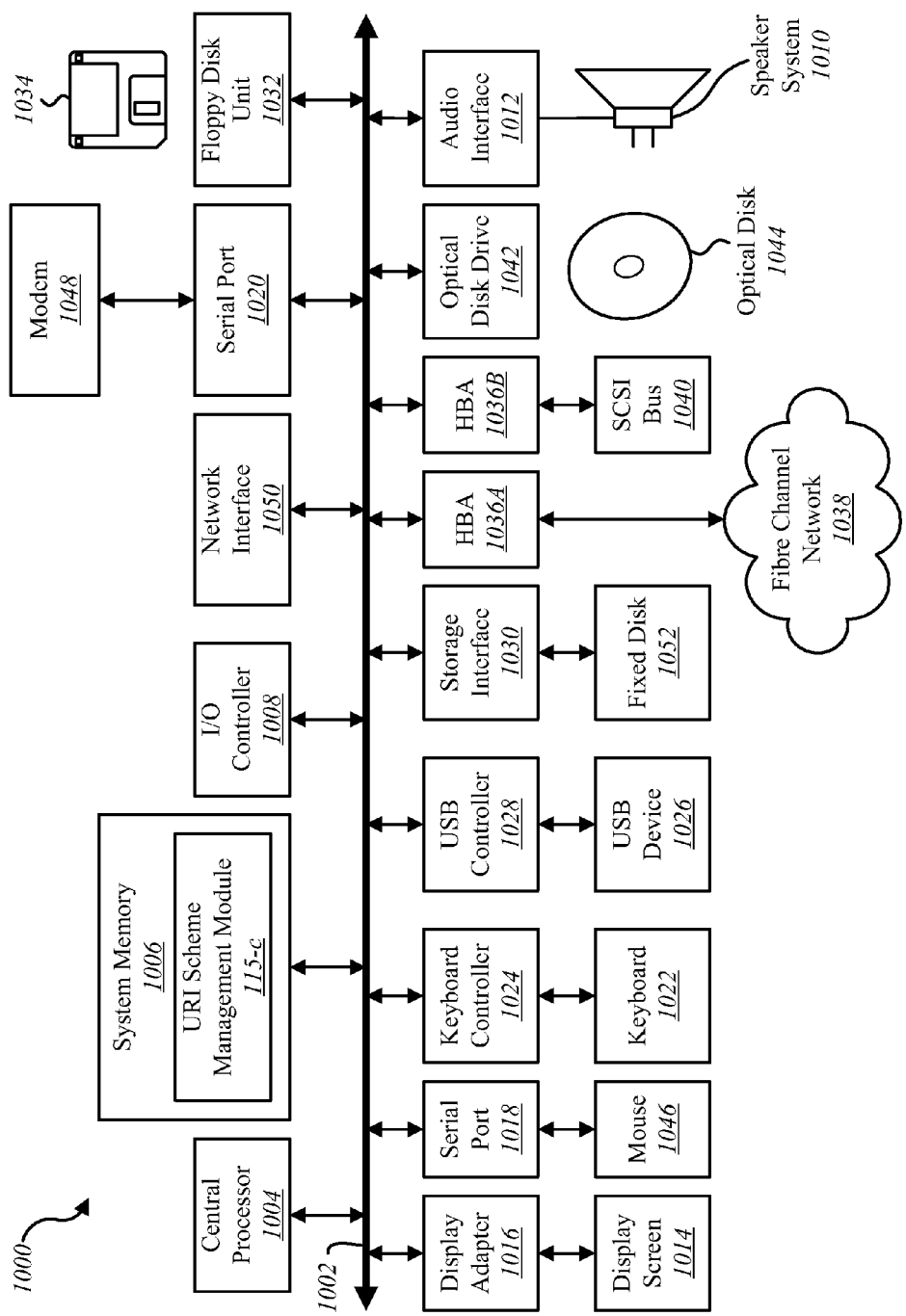
FIG. 10 depicts a block diagram of a computer system suitable for implementing the present systems and methods.

FIG. 10 depicts a block diagram of a computer system 1000 suitable for implementing the present systems and methods. Computer system 1000 includes a bus 1002 which interconnects major subsystems of computer system 1000, such as a central processor 1004, a system memory 1006 (typically RAM, but which may also include ROM, flash RAM, or the like), an input/output controller 1008, an external audio device, such as a speaker system 1010 via an audio output interface 1012, an external device, such as a display screen 1014 via display adapter 1016, serial ports 1018 and 1020, a keyboard 1022 (interfaced with a keyboard controller 1024), multiple USB devices 1026 (interfaced with a USB controller 1028), a storage interface 1030, a floppy disk unit 1032 operative to receive a floppy disk 1034, a host bus adapter (HBA) interface card 1036A operative to connect with a Fibre Channel network 1038, a host bus adapter (HBA) interface card 1036B operative to connect to a SCSI bus 1040, and an optical disk drive 1042 operative to receive an optical disk 1044. Also included are a mouse 1046 (or other point-and-click device, coupled to the bus 1002 via serial port 1018), a modem 1048 (coupled to bus 1002 via serial port 1020), and a network interface 1050 (coupled directly to bus 1002).

Bus 1002 allows data communication between central processor 1004 and system memory 1006, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the URI scheme management module 115-*c* to implement the present systems and methods may be stored within the system memory 1006. Applications resident with computer system 1000 are generally stored on and accessed via a non-transitory computer-readable medium, such as a hard disk drive (e.g., fixed disk 1052), an optical disk 1044, a floppy disk 1034, or other storage medium. Additionally, applications can be in the form of electronic signals modulated in accordance with the application and data communication technology when accessed via modem 1048 or network interface 1050.

Storage interface 1030, as with the other storage interfaces of computer system 1000, can connect to a standard computer-readable medium for storage and/or retrieval of information, such as a fixed disk 1052. Fixed disk 1052 may be a part of computer system 1000 or may be separate and accessed through other interface systems. Modem 1048 may provide a direct connection to a remote server via a telephone link or to the Internet via an internet service provider (ISP). Network interface 1050 may provide a direct connection to a remote server via a direct network link to the Internet via a POP (point of presence). Network interface 1050 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present systems and methods. The devices and subsystems can be interconnected in different ways from that shown in FIG. 10. The operation of a computer system such as that shown in FIG. 10 is readily known in the art and is not discussed in detail in this application. Code to implement the present disclosure can be stored in a non-transitory computer-readable medium such as one or more of system memory 1006, fixed disk 1052, optical disk 1044, or floppy disk 1034. The operating system provided on computer system 1000 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
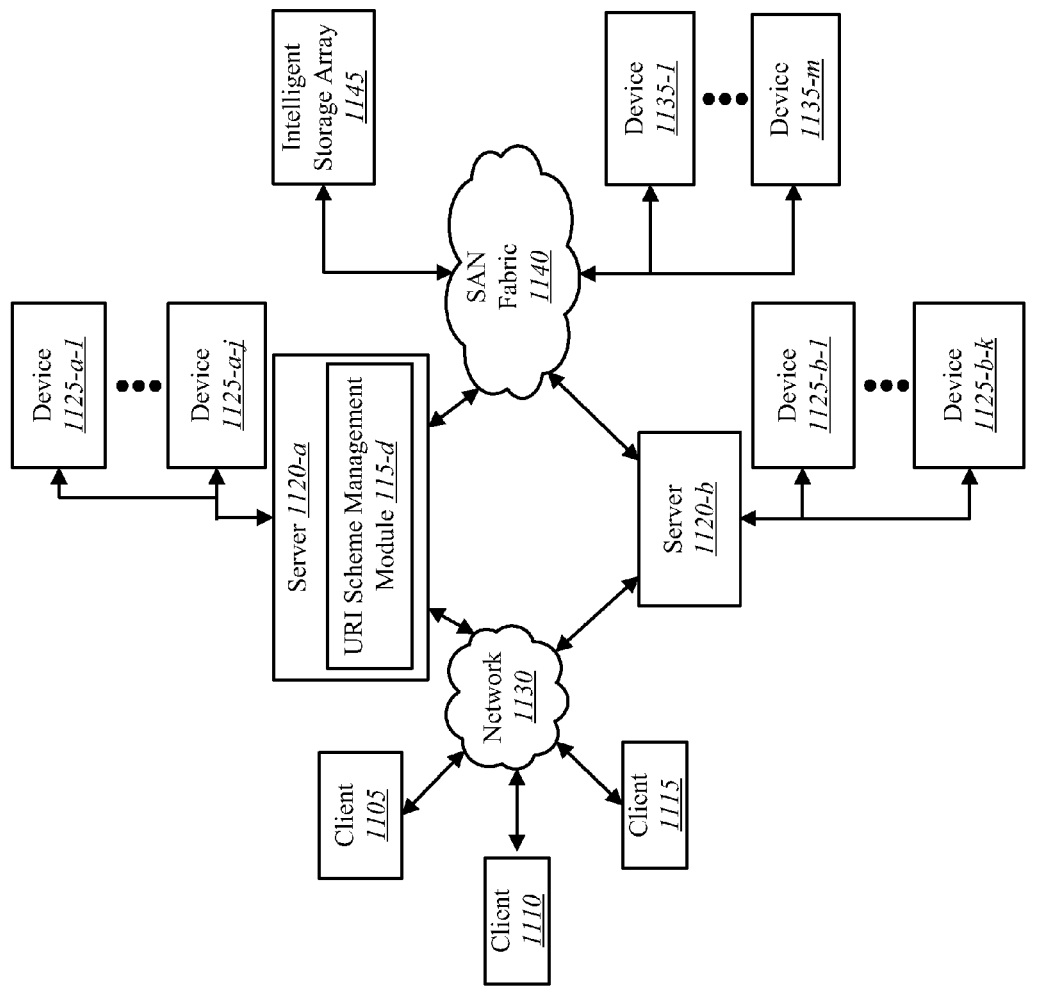
FIG. 11 is a block diagram depicting a network architecture in which client systems, as well as storage servers (any of which can be implemented using the computer system.

FIG. 11 is a block diagram depicting a network architecture 1100 in which client systems 1105, 1110 and 1115, as well as storage servers 1120-*a* and 1120-*b* (any of which can be implemented using computer system 1000), are coupled to a network 1130. In one embodiment, the URI scheme management module 115-d may be located within one of the storage servers 1120-a, 1120-b to implement the present systems and methods. The storage server 1120-a is further depicted as having storage devices 1125-a-1 through 1125-a-j directly attached, and storage server 1120-b is depicted with storage devices 1125-b-1 through 1125-b-k directly attached. SAN fabric 1140 supports access to storage devices 1135-l through 1135-m by storage servers 1120-a and 1120-b, and so by client systems 1105, 1110 and 115 via network 1130. Intelligent storage array 1145 is also shown as an example of a specific storage device accessible via SAN fabric 1140.

With reference to computer system 1000, modem 1048, network interface 1050 or some other method can be used to provide connectivity from each of client computer systems 1105, 1110 and 1115 to network 1130. Client systems 1105, 1110 and 1115 are able to access information on storage server 1120-a or 1120-b using, for example, a web browser or other client software (not shown). Such a client allows client systems 1105, 1110 and 1115 to access data hosted by storage server 1120-a or 1120-b or one of storage devices 1125-a-1-1125-a-j, 1125-b-1-1125-b-k, 1135-l-1135-m or intelligent storage array 1145. FIG. 11 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer implemented method for identifying a set of URI schemes registered with a device, comprising:
    enumerating, by a processor, each URI scheme having a URI scheme name beginning with a URI namespace name and ending with a character in a first character location of a URI namespace;
    iteratively, adding, by a processor, a next character location of the URI name space to the URI scheme of each enumerated URI scheme, and enumerating each URI scheme having a URI scheme name ending with a character in the next character location of the URI namespace; and
    identifying, by a processor, the set of URI schemes registered with the device, the URI schemes at ends of URI scheme name branches in the URI namespace.

2. The method of claim 1, further comprising:
    using a URI scheme name of each URI scheme in the set of URI schemes to access information pertaining to a respective ecosystem of applications corresponding to each URI scheme name.

3. The method of claim 2, further comprising:
    accessing the information on respective ecosystems of applications by accessing information stored in a shared storage location such as an iPhone Operating System (iOS) pasteboard.

4. The method of claim 2, wherein the information on each ecosystem of applications includes an identifier of each ecosystem of applications, the method further comprising:
    displaying the identifier of each ecosystem of applications to a user of the device.

5. The method of claim 4, further comprising:
    receiving a user selection of one of an ecosystem of applications; and
    initiating a process to join the user-selected ecosystem of applications.

6. The method of claim 4, wherein the identifier of each ecosystem of applications comprises a name.

7. The method of claim 4, wherein the identifier of each ecosystem of applications comprises an icon.

8. The method of claim 1, wherein the URI scheme is a URL scheme.

9. The method of claim 1, wherein the URI namespace comprises 32 character locations.

10. The method of claim 1, wherein the URI namespace comprises 16 character locations.

11. The method of claim 1, wherein the set of URI schemes comprises at least two URI schemes registered by different ecosystems of applications.

12. A computing device configured to identify a set of URI schemes, comprising:
    a processor;
    a memory in electronic communication with the processor;
    instructions stored in the memory, the instructions being executable by a processor to:

enumerate each URI scheme having a URI scheme name beginning with a URI namespace name and ending with a character in a first character location of a URI namespace;

iteratively, add a next character location of the URI namespace to the URI scheme name of each enumerated URI scheme, and enumerate each URI scheme having a URI scheme name ending with a character in the next character location of the URI namespace; and identify the set of URI schemes registered with the device, the URI schemes at ends of URI scheme name branches in the URI namespace.

13. The computing device of claim 12, wherein the instructions are further executable by the processor to:

use a URI scheme name of each URI scheme in the set of URI schemes to access information pertaining to a respective ecosystem of applications corresponding to each URI scheme name.

14. The computing device of claim 13, wherein the instructions are further executable by the processor to:

access the information on respective ecosystems of applications by accessing information stored in a shared storage location such as an iPhone Operating System (iOS) pasteboard.

15. The computing device of claim 13, wherein the information on each ecosystem of applications includes an identifier of each ecosystem of applications, and wherein the instructions are further executable by the processor to:

display the identifier of each ecosystem of applications to a user of the device.

16. The computing device of claim 15, wherein the instructions are further executable by the processor to:

receive a user selection of one of an ecosystem of applications; and initiate a process to join the user-selected ecosystem of applications.

17. A computer-program product for identifying a set of URI schemes on a device, the computer-program product comprising a non-transitory computer-readable medium having instructions thereon, the instructions being executable by a processor to:

enumerate each URI scheme having a URI scheme name beginning with a URI namespace name and ending with a character in a first character location of a URI namespace;

iteratively, add a next character location of the URI namespace to the URI scheme name of each enumerated URI scheme, and enumerate each URI scheme having a URI scheme name ending with a character in the next character location of the URI namespace; and identify the set of URI schemes registered with the device, the URI schemes at ends of URI scheme name branches in the URI namespace.

18. The computer-program product of claim 17, wherein the instructions are further executable by the processor to:

use a URI scheme name of each URI scheme in the set of URI schemes to access information pertaining to a respective ecosystem of applications corresponding to each URI scheme name.

19. The computer-program product of claim 18, wherein the information on each ecosystem of applications includes an identifier of each ecosystem of applications, and wherein the instructions are further executable by the processor to:

display the identifier of each ecosystem of applications to a user of the device.

20. The computer-program product of claim 18, wherein the instructions are further executable by the processor to:

receive a user selection of one of an ecosystem of applications; and initiate a process to join the user-selected ecosystem of applications.

* * * * *